(12) United States Patent
Tran et al.

(10) Patent No.: US 12,726,573 B2
(45) Date of Patent: Sep. 1, 2026

(54) TECHNIQUES FOR CONTEXT-BASED CALL ROUTING FOR SUPPORT SERVICES

(71) Applicant: T-Mobile USA, Inc., Bellevue, WA (US)

(72) Inventors: Antoine T. Tran, Bellevue, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 248 days.

(21) Appl. No.: 18/301,857

(22) Filed: Apr. 17, 2023

(65) Prior Publication Data

US 2024/0348727 A1 Oct. 17, 2024

(51) Int. Cl.
*H04M 3/523* (2006.01)

(52) U.S. Cl.
CPC ....... *H04M 3/5235* (2013.01); *H04M 3/5237* (2013.01)

(58) Field of Classification Search
None
See application file for complete search history.

(56) References Cited

U.S. PATENT DOCUMENTS

| | | | | |
|---|---|---|---|---|
| 9,065,917 | B1 * | 6/2015 | Taliancich | H04M 3/5235 |
| 9,319,522 | B1 * | 4/2016 | Webster | H04W 4/14 |
| 10,637,991 | B1 * | 4/2020 | Chan | H04M 3/42068 |
| 2006/0062376 | A1 * | 3/2006 | Pickford | H04M 3/5233<br>379/265.12 |
| 2007/0208579 | A1 * | 9/2007 | Peterson | G06Q 30/016<br>379/71 |

* cited by examiner

*Primary Examiner* — Hemant S Patel
(74) *Attorney, Agent, or Firm* — Lee & Hayes, P.C.

(57) ABSTRACT

Techniques are described herein for providing for automatic routing of a call to an appropriate support unit. Such techniques may comprise receiving, from an automatic call distributor (ACD) component, first information about a call that is received at a call center from a user. The techniques may be performed at a routing engine based on information about the call. Upon receiving such a call, second information associated with the call may be retrieved and, based on the first information and/or the second information associated with the call, a set of potential call reasons may be generated. A selected call reason may then be determined from the set of potential call reasons, a support unit associated with the selected call reason may be identified, and an indication of the support unit may be provided to the ACD component.

18 Claims, 7 Drawing Sheets

TECHNIQUES FOR CONTEXT-BASED CALL ROUTING FOR SUPPORT SERVICES

BACKGROUND

A "call center" is an organization of people, telecommunications equipment, and management software that is configured to provide customers with access to account services. Such call centers often use Interactive Voice Routing (IVR) to route customer calls to an appropriate support unit in accordance with selections made by the customer from a fixed interactive menu. However, such call routing can often be inefficient. Calls routed to the wrong support unit can have a cost to an organization in both time and resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This disclosure describes techniques that may be performed to route calls received from a customer to an appropriate support unit in an optimal manner. In embodiments, such routing may be performed in a manner that reduces any reliance on customer input. In conventional systems, the customer might select a call reason and/or an indication of a support unit using a preset menu. For example, an interactive voice response (IVR) system may be configured to present the customer with the preset menu and allow the customer to make a selection from that preset menu via selection of a number on their user device.

In embodiments of the disclosure, an automatic call distribution (ACD) component may receive a call from a user. The call may represent a communication initiated by the user with a customer support system for the purpose of addressing an issue with an account maintained by an operator of the customer support system. The ACD component may collect information about the call as it is received. Upon receiving such a call, the ACD component provides the collected information to a smart routing engine that is configured to identify an appropriate support unit for the call. In response, the ACD component receives an indication of the appropriate support unit from the smart routing engine and routes the call to that support unit.

A smart routing engine is configured to, upon initiation by an ACD component, identify an appropriate support unit for a call. To do this, the smart routing engine may retrieve information about the user associated with the call and/or a service used by that user. Based on that information, the smart routing engine may identify a set of potential reasons for a call. Each of the potential reasons in the set of potential reasons may be assigned a weight or other ranking value. A most likely reason is then selected from the set of potential reasons based on a respective weight value. Once the most likely reason has been selected, the support unit assigned to handle calls related to that reason is identified and an indication of that support unit is provided to the ACD component.

Embodiments of the disclosure provide for a number of advantages over conventional systems. For example, by implementing embodiments of the disclosure, an organization can more accurately route calls to support units. Conventional systems may rely upon routings made based on customer selections (e.g., selections from a preset menu). However, such selections may be suboptimal as the customer may not have a good understanding of the selections. By implementing embodiments of the disclosure, resource costs that can result from calls being received at the wrong support unit can be reduced or prevented.

Figure 1:
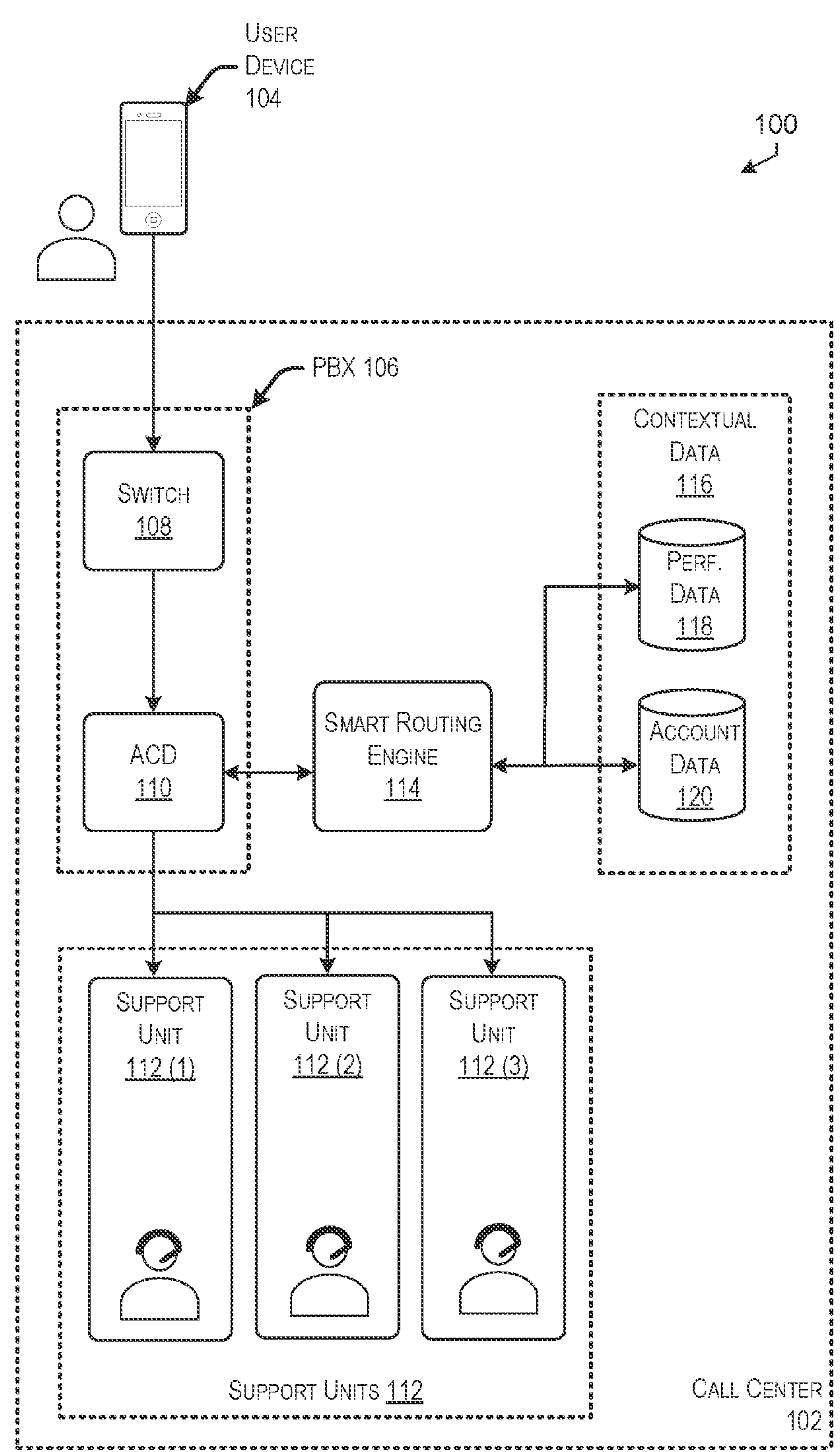
FIG. 1 depicts an example environment in which calls received from a user can be routed to an appropriate support unit based on contextual information in accordance with at least some embodiments.

FIG. 1 depicts an example environment in which calls received from a user can be routed to an appropriate support unit based on contextual information in accordance with at least some embodiments. In some embodiments, an example environment 100 may be implemented within a call center 102. The call center 102 is configured to receive communications (e.g., telephone calls) from one or more user device 104.

In some embodiments, communications received by the call center 102 may be received via a computerized Private Branch Exchange (PBX) 106. A PBX is typically recognized as a business telephone system that offers multiple inbound and outbound lines, call routing, voicemail, and call management features. In some embodiments, the PBX 106 may include one or more switch 108 configured to receive call communications as well as an Automatic Call Distribution (ACD) component 110 configured to provide routing of the received call communications to an appropriate support unit 112 of a number of support units 112 (e.g., 112(1)-112(3)). Each of a number of support units 112 (1-3) may be associated with a different subject. For example, one support group 112(1) might be associated with customer billing whereas another support group 112(2) is associated with equipment upgrades.

An ACD component 110 may be in communication with a smart routing engine 114 configured to provide predictive routing of call communications. More particularly, the smart routing engine 114 may be configured to make a prediction regarding a reason for the call communication received by the user device 104 in order to predict a support unit 112 that is associated with the predicted reason. To do this, the smart routing engine 114 may, upon detecting that a call communication has been received at the ACD 110, obtain contextual data 116 related to the call. In embodiments, such contextual data 116 may include some combination of performance data 118 and/or account data 120. In some embodiments, such a prediction may be further made based on information provided in relation to the call communication. For example, the prediction may be further made based on location information that is provided by the user device 104 in relation to the received call communication.

By way of illustration, consider an example, in which the call center 102 is operated by a cellular network provider. In this scenario, the smart routing engine 114 may be configured to make a determination as to whether or not the cellular network has outages in an area in which the user device 104 is located based on network performance data 118. If no network outage is detected in an area in which the user is located, then the smart routing engine 114 may be configured to determine whether any issues associated with an account of the customer would warrant a call to the call center. For example, the smart routing engine 114 may be configured to identify billing issues that might result in a customer contacting the call center.

In some embodiments, the smart routing engine 114 may be configured to take into account one or more customer-specific weighting factors that might warrant a call by the customer to the call center. For example, in some cases, historic call records for a customer may be used to determine a likely reason for a current call. Continuing with the above scenario, consider that a determination is made that a user is both currently in a location that is suffering a network outage and has a billing issue. Either of these conditions might warrant a call to the call center. In this scenario, a determination may also be made that the customer has made numerous calls to the call center regarding billing issues. Based on this additional determination, the smart routing engine 114 may assign a higher weight to the likelihood that the customer is calling about the billing issue rather than the network outage.

Upon the smart routing engine 114 generating a prediction of an appropriate support unit 112 of the available support units 112 (1-3), that prediction is then provided to the ACD 110. Upon receiving such a prediction, the ACD 110 may be configured to route the received call communication to the predicted support unit 112.

Figure 2:
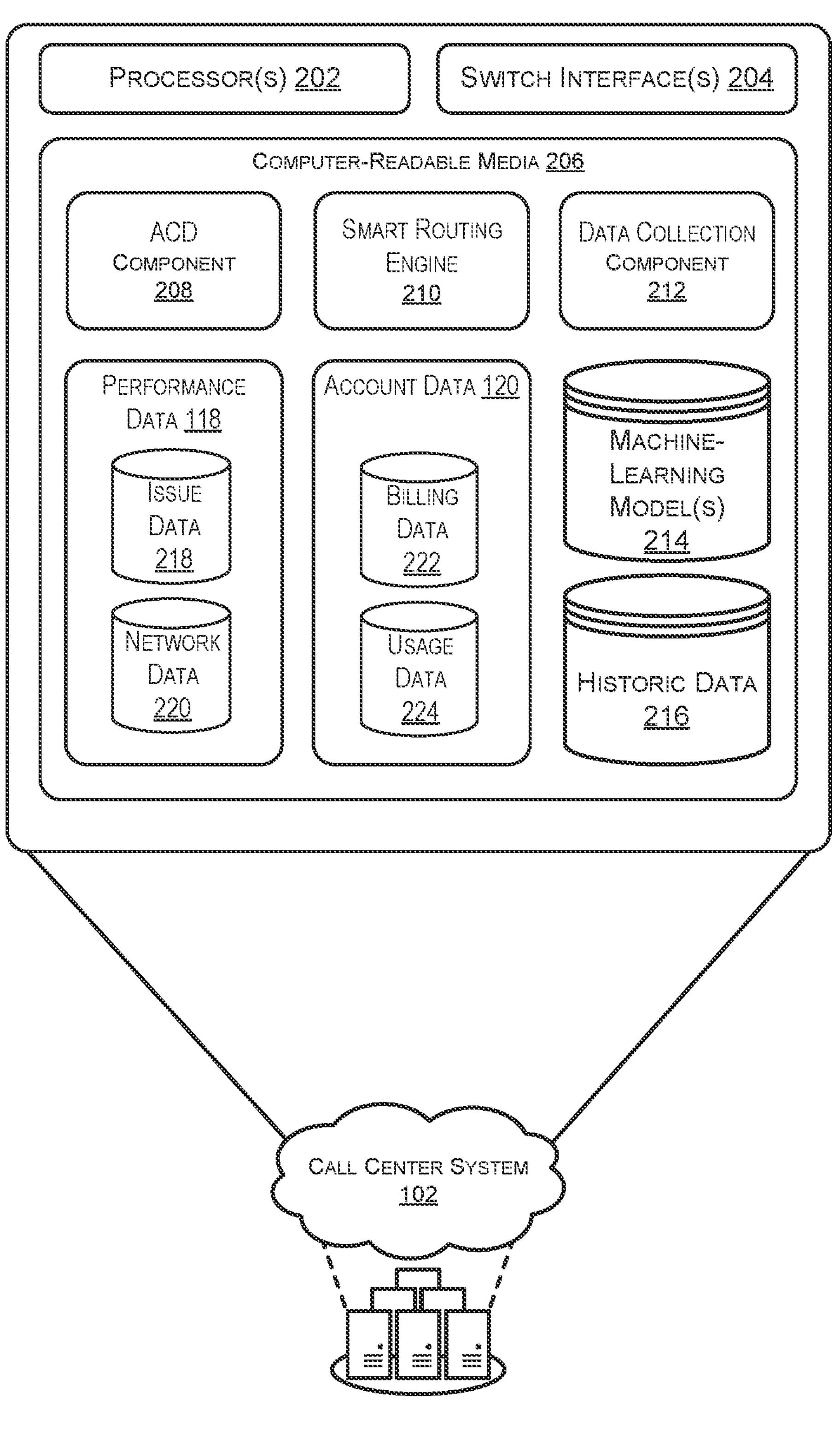
FIG. 2 depicts a component diagram of an example call center system that is configured to route received calls to an appropriate support unit based on a predicted call reason in accordance with at least some embodiments.

FIG. 2 depicts a component diagram of an example call center system that is configured to route received calls to an appropriate support unit based on a predicted call reason in accordance with at least some embodiments. The exemplary call center system 102 may be an example of the call center system 102 as described in relation to FIG. 1 above. It should be noted that the call center system may include a single computing device (e.g., a server device) or a combination of computing devices. In some cases, the call center system may be implemented as a virtual system (e.g., via virtual machines implemented within a cloud computing environment).

As illustrated, the call center system 102 may include one or more hardware processors 202 (processors), one or more devices, configured to execute one or more stored instructions. Such processor(s) 202 may comprise one or more processing cores. Further, the call center system 102 may include one or more switch interfaces 204 configured to provide communications between the call center system 102 and other devices, such as the user device(s) 104 and/or other systems or devices associated with the call center.

The call center system 102 may also include computer-readable media 206 that stores various executable components (e.g., software-based components, firmware-based components, etc.). The computer-readable-media 206 may store components to implement functionality described herein. While not illustrated, the computer-readable media 206 may store one or more operating systems utilized to control the operation of the one or more devices that comprise the call center system 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the call center system 102 to perform various operations described herein. For example, the computer-readable media 206 may include some combination of components configured to implement the described techniques. Particularly, the call center system 102 may include a component configured to provide automatic routing of calls received at the call center (e.g., Automatic Call Distribution (ACD) component 208), a component configured to identify an appropriate support unit to which a call should be routed (e.g., smart routing engine 210), and a component configured to collect and aggregate relevant data (e.g., data collection component 212). Additionally, the computer readable media 206 may include various data sources to be used by the call center system in performing the techniques. For example, the computer readable media 206 may include performance data 118 that includes information about performance of one or more services offered by an operator of the call center system. In another example, the computer readable media 206 may include account data 120 that includes information maintained about a customer of one or more services offered by an operator of the call center system. Additionally, the computer readable media 206 may further store one or more trained machine learning models 214 and/or historic data 216 obtained by the call center system.

An ACD component 208 may be configured to, when executed by the processor(s) 202, route calls received from a customer outside of a call center system to a support unit within the call center system. The ACD component may be configured to route the call to an appropriate support unit based on information provided by a smart routing engine 210 in communication with the ACD component 208. In some embodiments, the ACD component 208 is configured to, upon receiving a call from a customer, provide information about the call to the smart routing engine 210. In response, the ACD component 208 receives an indication of a support unit to which the call is to be routed.

In some embodiments, the ACD component may be further configured to generate a dynamic menu to be presented to the customer. For example, in some cases, the ACD component may receive an indication of multiple potential reasons/support units to which the call may be routed. In this scenario, the ACD component may generate a menu that includes at least some of the multiple potential reasons/support units that is then presented to the customer. In this scenario, the ACD component may receive an indication of a selected reason of the potential reasons based on a response received from the customer in relation to the presentation of the generated menu.

A smart routing engine 210 may be configured to, when executed by the processor(s) 202, receive information about a call received by an ACD component 208 and determine an appropriate support unit based on information about the call. In some embodiments, this involves identifying the originator of the call and retrieving information that impacts that customer. In some cases, the originator of the call is identified based on information received by the ACD component in relation to the call. For example, a lookup may be performed on a phone number associated with the call as determined via caller identification functionality.

The smart routing engine 210 may be configured to identify a number of potential reasons that may relate to the received call based on issues identified for information retrieved in relation to the call. The smart routing engine 210 may, upon identifying multiple potential reasons associated with the call, assign a weight or other value to each of the potential reasons. Such a weight may be assigned based on external factors (e.g., consumer trends) or internal factors (e.g., historic user preferences). Once a set of potential reasons has been generated for the call, a most likely reason may be selected from the set of potential reasons based on a weight assigned to the reason. For example, the potential reason having the highest weight (i.e., likelihood) is selected from the set of potential reasons. Once a most likely reason has been determined, a support unit may subsequently be identified by virtue of its association with the determined reason. For example, a lookup may be performed to determine, from a stored mapping of reasons to support units, a support unit configured to handle the call. Once such a support unit has been identified, the smart routing engine 210 may be configured to provide an indication of that support unit to the ACD component 208 to cause the ACD component to route the call to the indicated support unit.

In some embodiments, the call center system 102 may include one or more machine learning models 214 that have been trained to correlate inputs associated with a customer/call to a support unit. In embodiments, training for a machine learning model 214 can be performed by providing a training set of historic data (e.g., historic data 216) to a machine learning model. In this example, information about the historic calls is provided as input data and an identification of the ultimate support unit to which the respective call was routed is provided as output data. The machine learning model is then trained to correlate the information about the call to the support unit. In embodiments, the smart routing engine 210 may be configured to execute the trained machine learning model 214 by providing the information about a call as input values. In these embodiments, the trained machine learning model 214 is then configured to output an indication of a reason/support unit for the call.

A data collection component 212 may be configured to, when executed by the processor(s) 202, collect information about a call and the support unit at which it ultimately ends up. In some cases, this data is provided as feedback to be used to adjust or otherwise update the machine-learning model(s) 214. In some cases, the data collection component 212 is configured to collect information about preferences/tendencies of an originator of the call (e.g., a customer or account). For example, the data collection component 212 may be configured to adjust a weight associated with the identified support unit upward for the originator of the call, such that future calls received from the originator of the call are more likely to be routed to that support unit.

As noted elsewhere, performance data 118 may include a number of separate databases that store different types of data. In a nonlimiting example, such performance data 118 may include issue data 218 that includes information about known issues (e.g., open trouble tickets, etc.) related to one or more services offered by an operator of the call center system. In another example in which the call center is operated by a mobile network provider, such performance data 118 may include information about a status of the mobile network (e.g., network data 220) such as information about coverage of the mobile network and/or known outage areas.

As noted elsewhere, account data 120 may include a number of separate databases that store different types of data. In a nonlimiting example, such account data 120 may include billing data 222 that includes information about billing for one or more customer accounts. In another example, the account data 120 may include usage data 224 that includes information about usage of services offered by an operator of the call center by one or more customers. For example, where the call center is operated by a mobile network provider, usage data 224 may include information about an amount of bandwidth consumed by each customer over a period of time (e.g., a month). Additionally, such usage data 224 may include information about types of services consumed by each customer.

Figure 3:
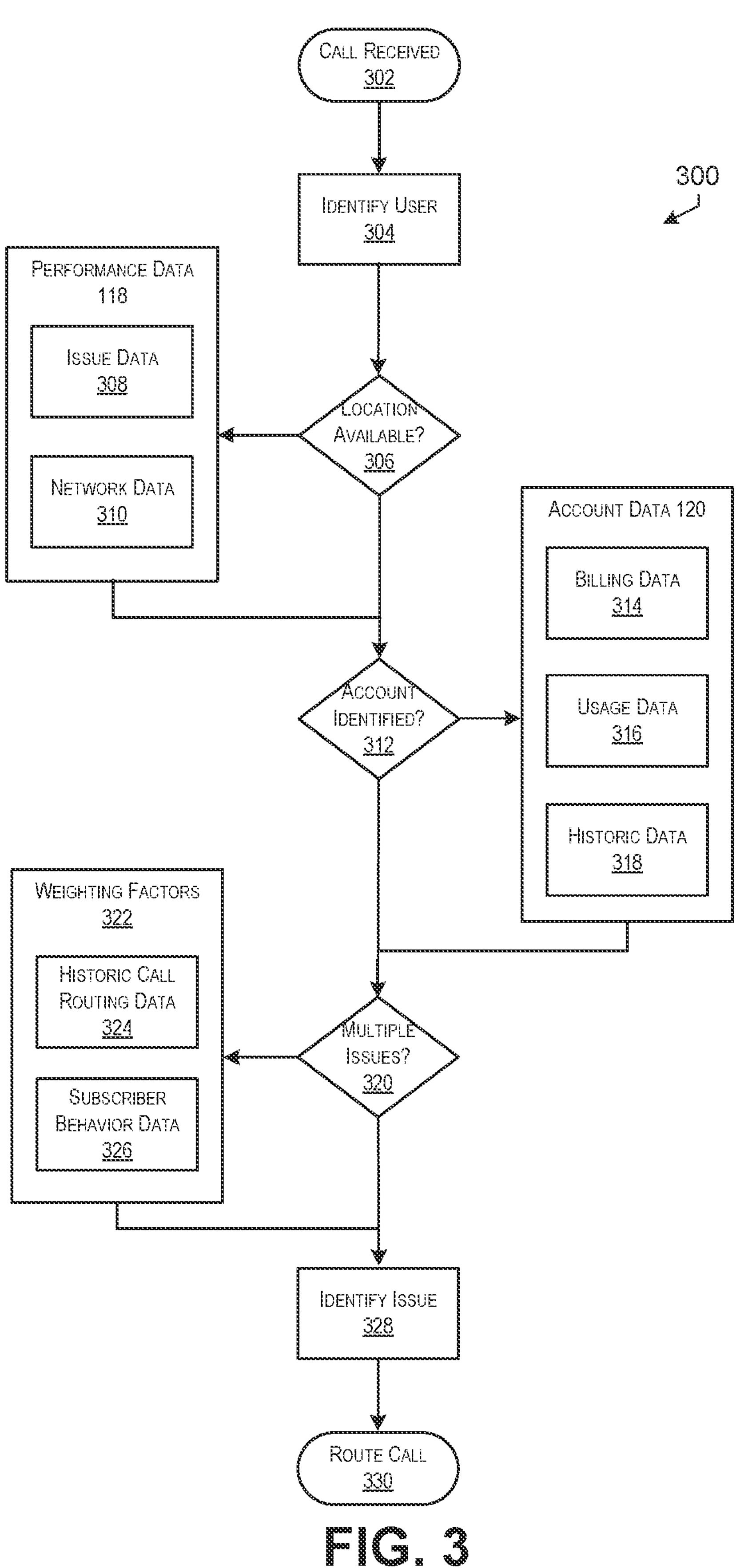
FIG. 3 depicts a flow chart illustrating a process for routing a received call based on a predicted call reason in accordance with at least some embodiments.

FIG. 3 depicts a flow chart illustrating a process for routing a received call based on a predicted call reason in accordance with at least some embodiments. The process 300 may be performed by any suitable computing component (either software or hardware), such as, but not limited to, the smart routing engine 114 as described in relation to FIG. 1 above. In embodiments, the process may be performed on calls received at an Automatic Call Distribution (ACD) component implemented within a call center, such as the ACD 110 as described in relation to FIG. 1 above. For illustrative purposes, the process 300 is described as relating to a call received by a customer support center for a mobile network operator.

At 302, the process 300 may involve receiving, at a smart routing engine, information about a call to be routed by an ACD component. The information may include any suitable data about the call. For example, the information may include an indication of a current location of a user device from which the call originated, an indication of a user identifier and/or account identifier associated with the call, a device type used to make the call, or any other suitable information related to the received call.

At 304, the process 300 may involve identifying a user and/or an account associated with the call. In some embodiments, this may involve performing a lookup on an identifier (e.g., a user identifier and/or account identifier) associated with the call. In some embodiments, this may involve performing a lookup based on a phone number associated with the received call.

At 306, the process 300 may involve making a determination as to whether location data is available for the received call. Location data may refer to any suitable location associated with a user. For example, the location data may refer to a current location of a user device used to make the call or location data may refer to a location generally associated with a user identified at 304 (e.g., a home address). Provided that such location data is available (e.g., "Yes" at block 306), the process may further involve identifying one or more potential reasons for the call based on performance data 118. Provided that such location data is not available (e.g., "No" at block 306), the process may continue to the next step.

Performance data 118 may include any suitable information about a performance of a service provided by an operator of the ACD. For example, where the operator of the ACD is a mobile network provider, performance data 118 may include information about known issues associated with particular locations/regions (e.g., issue data 308) associated with the mobile network and/or information about areas/regions (e.g., network data 310) capable of being provided services associated with the mobile network. In this example, a determination may be made as to whether the location data is indicative of a location that is covered by the mobile network (via network data 310) as well as whether that location is currently subject to a network outage (via issue data 308). In some embodiments, the issue data 308 may maintain a record of issues that are attributable to particular areas/regions of the network data 310. Such issues may be temporary and may include an indication of a start time/date for the issue as well as (in some cases) an estimated or predicted issue resolution date/time. Based on the performance data 118, the process may involve generating a set of known issues that are impacting the identified user based on the location information for that user.

At 312, the process 300 may involve making a determination as to whether an account identifier is available in relation to the received call. Provided that such an account identifier is available (e.g., "Yes" at block 312), the process may further involve identifying one or more potential reasons for the call based on account data 120. Provided that such an account identifier is not available (e.g., "No" at block 312), the process may continue to the next step.

Account data 120 may include any suitable information about an account maintained in relation to a user. For example, where the operator of the ACD is a mobile network provider, account data 120 may include information about a balance/payment history associated with the account (e.g., billing data 314), information about usage (e.g., how much, what types, etc.) of a service provided by the operator of the call center (e.g., usage data 316), and/or information about historic issues impacting the user (e.g., historic data 318). In some cases, a determination may be made as to whether there are outstanding billing issues that might warrant a potential call.

By way of illustration, a determination may be made as to whether a current bill amount deviates substantially (e.g., greater than a threshold amount) from a previous bill amount or a historic average bill amount. In some cases, a determination may be made as to whether a current data usage (e.g., amount of data used within the last month, etc.) amount deviates substantially (e.g., greater than a threshold amount) from a previous data usage amount or a historic average data usage amount. In some cases, a determination may be made as to whether there are any currently unresolved issues associated with the account (e.g., open billing disputes, equipment upgrades, etc.). Based on the account data 120, the process may involve generating a set of potential issues that are relevant to an account for that user. In some cases, the generated set of potential issues is appended to the set of issues generated at 306.

As noted above, a set of potential issues may be generated by combining those generated at steps 306 and 312. In some cases, a smart routing engine is configured to select a potential issue from the set of potential issues that is the most likely reason for the call. In some embodiments, each of the potential issues in the set of potential issues may be assigned a weight or other priority value that can be used to identify the issue that is most likely associated with the call. In some cases, such a weight assigned to each potential issue may be assigned based on a default weight value associated with a type or category into which the potential issue belongs (e.g., billing issues, etc.).

At 320, the process 300 may involve making a determination as to whether one or more weighting factors 322 should be considered. Such a determination may initially depend upon whether the set of potential issues includes more than one potential issue. Provided that a set of potential issues includes multiple potential issues (e.g., "Yes" at block 320), the process may further involve adjusting one or more weight values of the potential issues in the set of potential issues based on weighting factors 322. Provided that the set of potential issues does not include more than one potential issue (e.g., "No" at block 320), the process may continue to the next step.

Weighting factors 322 may include any suitable information about preferences of a user or users in general. For example, weighting factors 322 may include historic call routing data for the user and/or users in general. For example, if the user (or similarly situated users) is determined to have frequently contacted customer service about a particular type of issue, then a weight associated with issues of that type within the set of potential issues. In another example, current subscriber behavior data 326 may be used to identify types of issues that are currently receiving a high number of customer service calls. In this example, a weight value associated with each of the issues of the set of potential issues can be increased or decreased based on the subscriber behavior data 326.

At 328, the process 300 may involve identifying an issue from the set of potential issues that is the most likely issue for the call. This may involve determining the potential issue that has the highest weight value from the set of potential issues.

At 330, the process 300 may involve routing the call in accordance with the prediction. To do this, the smart routing engine may identify a support unit associated with the selected issue. An identification of that support unit is then provided to the ACD to cause the call to be routed to the identified support unit.

Figure 4:
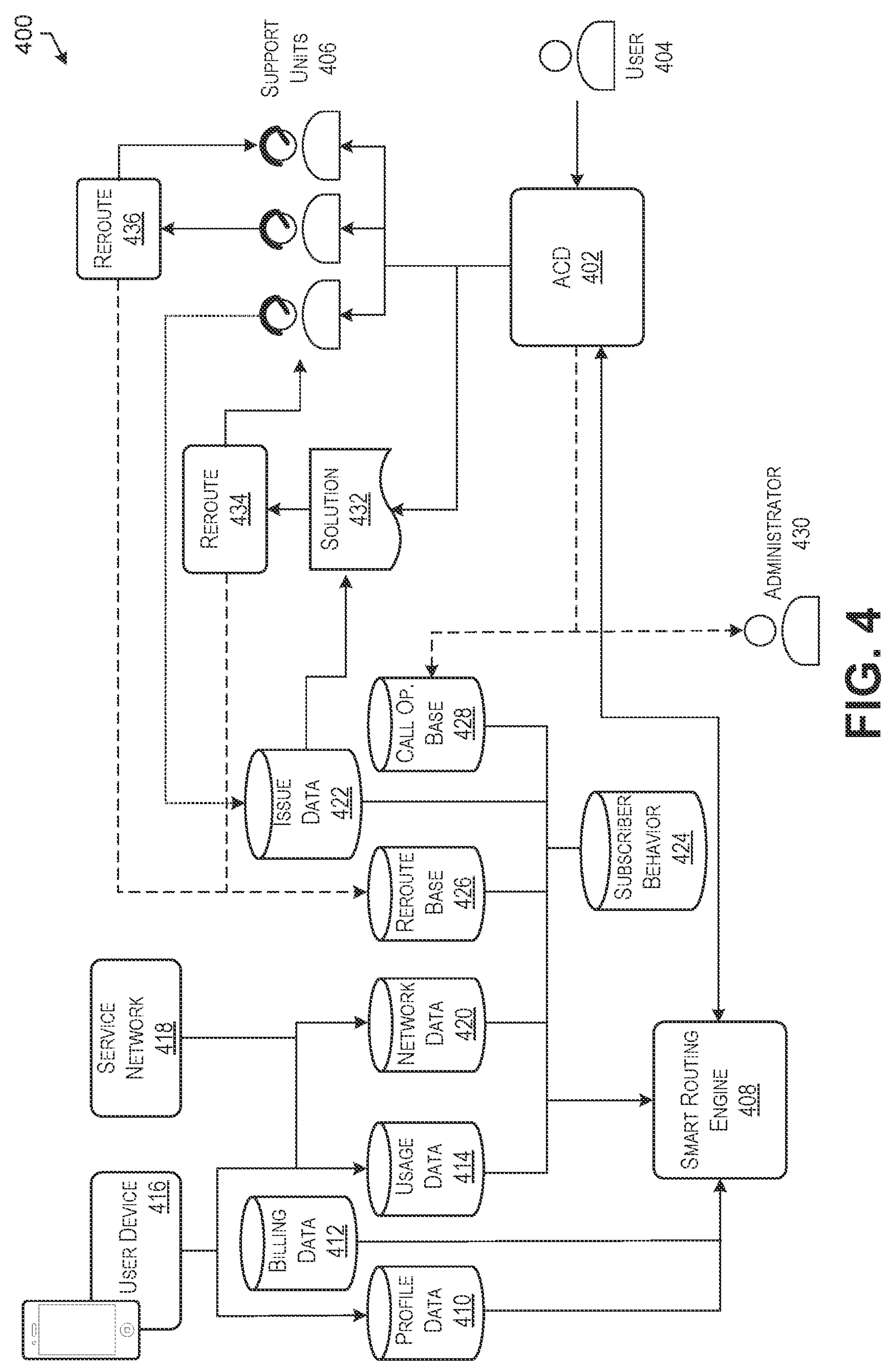
FIG. 4 depicts a block diagram illustrating components of a system configured to route calls to an appropriate support unit in accordance with at least some embodiments.

FIG. 4 depicts a block diagram illustrating components of a system configured to route calls to an appropriate support unit in accordance with at least some embodiments. The system 400 may be implemented within a call center, such as the call center 102 as described in relation to FIG. 1 above.

As noted elsewhere, the system 400 might include an automated call distribution (ACD) component 402 that is configured to route calls received from a user (e.g., a customer or account holder) 404 to an appropriate support unit 406 of a number of available support units. In embodiments, each of the support units 406 may be associated with a different category, or set of categories, of support operations. Additionally, the system 400 may include a smart routing engine 408 configured to determine an appropriate support unit 406 to which the call is to be routed based on various information maintained by the system 400.

A smart routing engine 408 may be configured to receive information about a call received at the ACD component 402 and determine, based on that information, an appropriate support unit 406 to which the call is to be routed. Such a determination may be made based on information about a user as well as information about a service provided by an entity affiliated with the system 400.

As noted above, the system 400 may maintain information about a number of users (e.g., customers and/or account holders). Such information might include profile data 410 that includes information about preferences and/or demographic information associated with a number of users, billing data 412 that includes information about historical billing records for a number of users, and/or usage data 414 that includes information about historical use of one or more services offered (e.g., amounts and types of data) in relation to the system 400 by a number of users. The smart routing engine 408 may be configured to retrieve the information about a particular user 404 from the information maintained about a number of users (e.g., 410-414). In some embodiments, at least some of the information maintained about a number of users may be obtained from one or more user devices 416 operated by, or in the possession of, the number of users. In some cases, at least some of the information maintained about a number of users may be obtained from a service network 418 (e.g., a mobile network) that provides access to one or more services operated by an entity affiliated with the system 400.

Additionally, the system 400 may maintain information about performance of one or more services offered in relation to the system 400 (e.g., an example of performance data 118). Such information might include network data 420 that includes information about performance of a network (e.g., coverage, outages, etc.) as well as issue data 422 that includes information about known issues (e.g., trouble tickets) associated with one or more services. The smart routing engine 408 may be configured to retrieve the information about performance of the one or more services in relation to the call. In this example, the information may be retrieved in relation to a location at which the call originated.

In some embodiments, the system 400 may maintain information about historical subscriber behavior 424 that includes details of calls made by a number of subscribers (e.g., customers/users) as well as corresponding support units that handled the calls. The subscriber behavior 424 may include information about a recorded reason for each of the calls. In some embodiments, the subscriber behavior 424 includes information about dates/times of the received calls. In these embodiments, call reason trends may be identified within the subscriber data that represent increases or decreases in prevalence of various call reasons.

In some cases, the system 400 may maintain various other databases, such as a reroute base 426 that includes information about calls that were previously rerouted within the system. For example, when a call is rerouted (e.g., transferred) by a first support unit to a second support unit, information about that rerouted call is maintained. In some cases, the reroute base data 426 is used to update a determined appropriate support unit for similar calls. In some embodiments, the reroute base data 426 may be used to adjust or otherwise modify a machine learning model (e.g., machine learning model 214 of FIG. 2).

In some embodiments, the system 400 may maintain call operation base data 428 that includes information about call statistics/metrics. In some cases, information stored in a call operation base data 428 may be provided to one or more administrator 430 associated with the system 400, which is able to access and/or edit the data. An administrator 430 may be any person associated with the system 400, such as a supervisor or other entity.

As noted elsewhere, the smart routing engine 408 may make a determination of a reason and/or support unit to which a call is to be routed based on the information retrieved from the system 400. Once a reason/support unit has been identified by the smart routing engine 408, that information is provided back to the ACD component 402, which is then caused to route the call to the identified support unit 406.

In some cases, where the smart routing engine 408 determines that the reason for the call relates to a known issue (e.g., based on the issue data 422), the ACD 402 may be further configured to initiate a recorded solution 432 to the known issue. This might involve adjusting a setting or other information associated with the user, pushing a software update/patch to a user device operated by the user, providing a presentation of steps to enable the solution 432, or any other suitable automated means of initiating the solution 432. If the automated initiation of the solution 432 is determined to have not been effective (e.g., based on an indication received from the user 404) or is determined to be unrelated to the call, then the call may be subjected to a reroute 434 to a support unit identified by the smart routing engine 408.

It should be noted that once a call has been routed to a particular support unit 406, that call can be subjected to a reroute 436 by that support unit in order to transfer the call to a more appropriate support unit. Each time that such a reroute 436 is performed, information about the reroute may be stored by the system 400 (e.g., in reroute base 426) and used in future support unit identification processes. In some cases, such data may be used to update a machine-learning model (e.g., machine learning model 214).

In some embodiments, the smart routing engine 408 may identify a number of potential reasons for a call, each of which is equally (or substantially equally) likely. In some of these cases, the ACD 402 may be further configured to generate and present a menu to the user 404 in order to clarify, or narrow down, a reason for the call. For example, the ACD 402 may be provided by the smart routing engine 408 with three potential reasons for the call. In this scenario, the ACD 402 may present the three reasons to the user 404 via his or her user device and may ask the user to make a selection. Presentation of the menu may be made audibly (e.g., via an IVR menu) or visually (e.g., depicted on a display of the user device) and the user's selection may be received based on selection of a button or other interactive element of the user device. Upon receiving a selection from the user, the ACD 402 may then be configured to route the call according to that selection.

Figure 5:
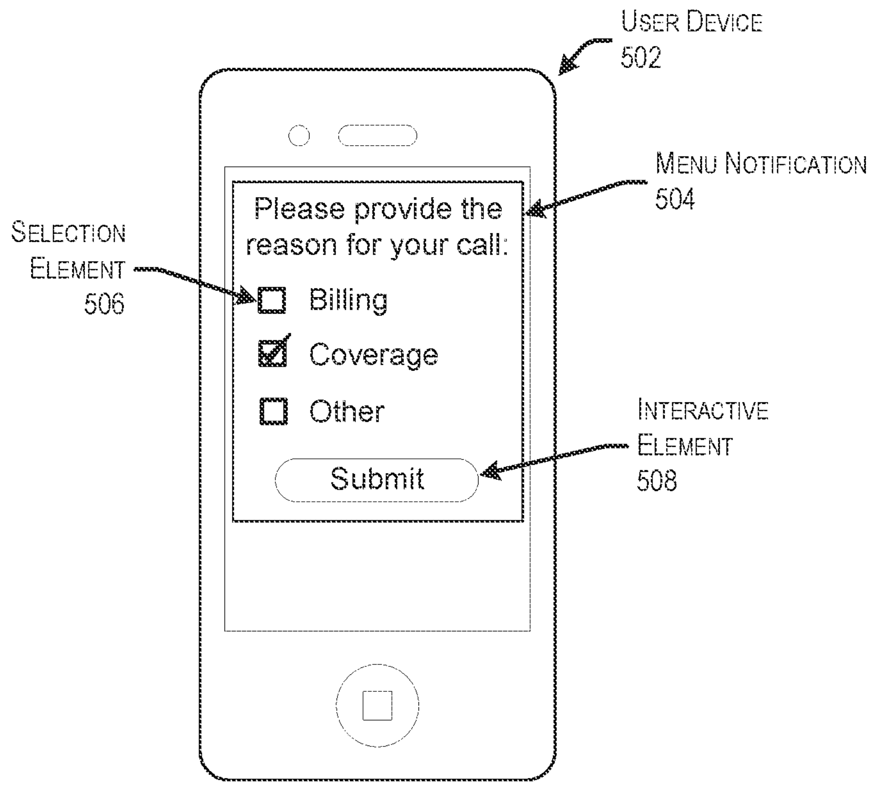
FIG. 5 depicts a graphical user interface that illustrates an example of a menu notification that may be provided to a user device in order to clarify a call reason in accordance with at least some embodiments.

FIG. 5 depicts a graphical user interface that illustrates an example of a menu notification that may be provided to a user device in order to clarify a call reason in accordance with at least some embodiments. The graphical user interface (GUI) is implemented on a user device 502. In some cases, the user device 502 is the user device used to initiate the call at issue. However, in other cases the user device 502 may be one that is associated with a user identified in relation to the call, regardless of whether that user device 502 was used to initiate the call.

As noted elsewhere, when a user places a call to a call center system as implemented herein, a determination may be made as to one or more potential reasons for that call. As also noted, the call may be routed automatically (e.g., by an ACD component) to a support unit that is responsible for handling calls related to an identified reason. However, when multiple potential reasons are identified in relation to the call, the ACD component may be further configured to identify the reason by receiving a selection of the reason from a user. To do this, the ACD component may, upon receiving an indication of multiple potential reasons for the call from a smart routing engine, generate a menu that includes those potential reasons that is then presented to the user via a menu notification 504. In some embodiments, the menu notification is presented audibly (e.g., as audio data through a speaker of the user device 502) to the user and the user may be asked to select one of the menu items by pressing a button or other interactive element. In some embodiments (as depicted), the menu notification 504 is presented visually on the GUI of the user device.

As depicted, the menu notification 504 may include at least an indication (e.g., a list) of the multiple potential reasons to be selected from. In some cases, the indication of the multiple potential reasons may include a selection element 506 that enables a user of the user device 502 to select one or more of the multiple potential reasons as the real reason for the call.

In embodiments, upon being presented with the menu notification 504, the user of the user device 502 may make a selection of one or more of the multiple potential reasons via a selection element 506 associated with each of the potential recipients. Upon completing the selection of which reasons (if any) are related to the call, the user may submit the selection to the system by interacting with an interactive element 508, such as a button.

Upon receiving a selection of a reason from the user based on presentation of the generated menu, the ACD component may be configured to subsequently route the call to a support unit associated with the selected reason absent any further instruction from the user.

Figure 6:
FIG. 6 depicts a flow diagram illustrating an exemplary process for routing a received call based on information about the received call in accordance with at least some embodiments.
Figure 6:
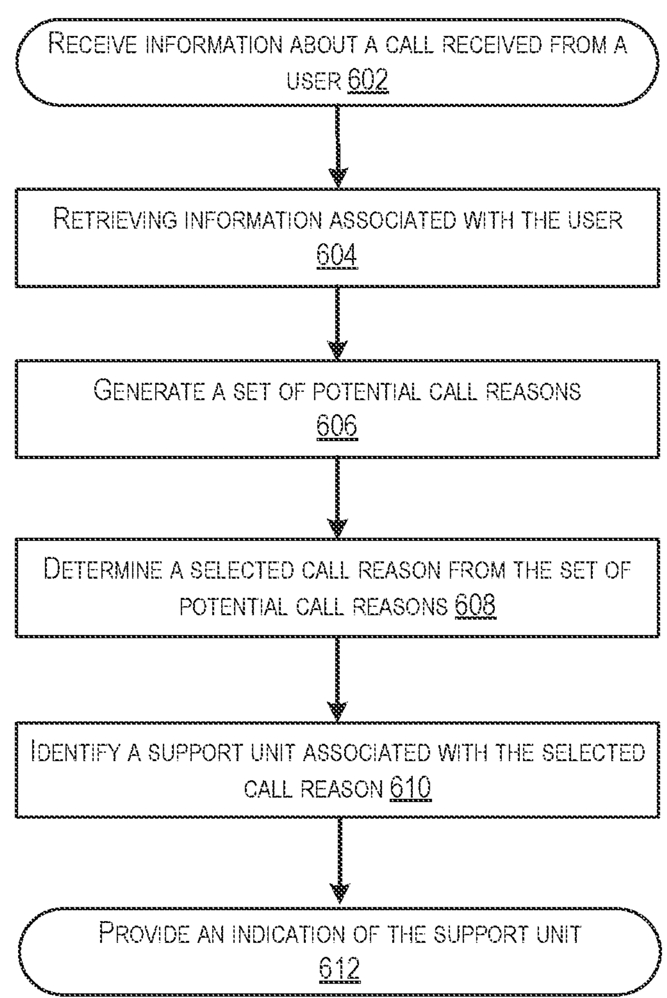

FIG. 6 depicts a flow diagram illustrating an exemplary process for routing a received call based on information about the received call in accordance with at least some embodiments. The process 600 may be performed by a call center computing device, such as the call center computing device 102 as described in relation to FIG. 1 above.

At 602, the process 600 may involve receiving information about a call received from a user. In some embodiments, the information associated with the call includes data maintained in relation to the user. For example, such information may include at least one of billing data for the user, profile data for the user, or usage data for the user. In some embodiments, the information associated with the call includes data maintained in relation to a service associated with the call center. For example, the data maintained in relation to a service may include at least one of known issue data for the service or network coverage data for the service.

At 604, the process 600 may involve retrieving information associated with the call. In some embodiments, the process may further involve identifying the user based on identifying information that is received in relation to the call. For example, the user may be identified based on a phone number for the user identified using caller identification information for the call. The user may then be identified by performing a lookup operation on the caller identification information.

At 606, the process 600 may involve generating, based on the information associated with the call, a set of potential call reasons. In some embodiments, the set of potential call reasons is generated based on differences identified from the second information. For example, at least one potential call reason of the set of call reasons may be identified based on a difference in value between a recent value and a historic average value within the second information. In some cases, the at least one potential call reason is identified if the difference in value is greater than a threshold difference.

By way of illustration, current billing may be identified as a potential call reason if a current (or recent) billing amount for a user varies substantially (e.g., more than a threshold amount) from a historic average billing amount for that user. In another example, network coverage may be identified as a potential call reason if a number of dropped calls or failed data access attempts in a preceding period of time (e.g., 1 month) is greater than a historic average of dropped calls or failed data access attempts throughout a historic period.

In some cases, the set of potential call reasons is generated using a trained machine-learning model. In embodiments, after the call has been routed to the indicated support unit, the call may be forwarded (e.g., rerouted) by the indicated support unit to a second support unit. In these cases, the trained machine-learning model may be updated to reflect the relevance of the second support unit to the call.

At 608, the process 600 may involve determining, from the set of potential call reasons, a selected call reason. In some embodiments, this may involve assigning a weight value to individual call reasons in the set of potential call reasons. In these embodiments, the selected call reason is determined based on the weight value. For example, the call reason of the set of call reasons having the highest weight value may be selected as the most likely reason for the call.

At 610, the process 600 may involve identifying a support unit associated with the selected call reason. In some embodiments, the support unit is identified based on a mapping between the support unit and the selected call reason within mapping data stored by the call center. For example, each potential call reason may be mapped to a support unit. In some cases, multiple call reasons may be assigned to an individual support unit. At 612, the process 600 may involve providing an indication of the support unit in response to the received information about the call.

Figure 7:
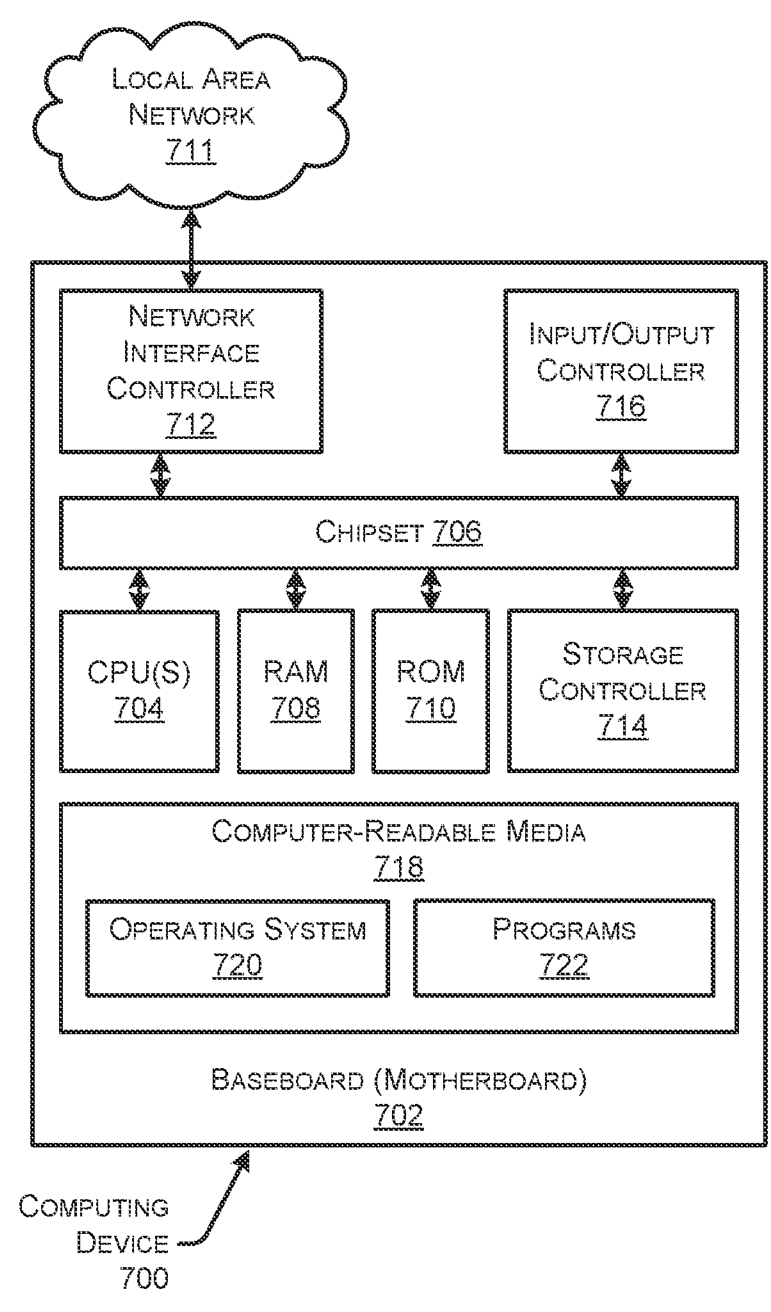
FIG. 7 shows an example computer architecture for a server computer capable of executing program components for implementing the functionality described above.

FIG. 7 shows an example computer architecture for a computing device 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a physical server as described herein, and may comprise networked devices such as servers, switches, routers, hubs, bridges, gateways, modems, repeaters, access points, etc.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 702. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 711. The chipset 706 can include functionality for providing network connectivity through a NIC 712, such as a gigabit Ethernet adapter. The NIC 712 is capable of connecting the computing device 700 to other computing devices over the network 711. It should be appreciated that multiple NICs 712 can be present in the computing device 700, connecting the computer to other types of networks and remote computer systems.

The computing device 700 can be connected to a storage device 718 that provides non-volatile storage for the computer. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by devices as described herein may be supported by one or more devices similar to computing device 700. Stated otherwise, some or all of the operations performed by an edge device, and/or any components included therein, may be performed by one or more computer device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to the other figures. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

As described herein, the computing device 700 may include one or more hardware processors 704 (processors) configured to execute one or more stored instructions. The processor(s) 704 may comprise one or more cores. Further, the computing device 700 may include one or more network interfaces configured to provide communications between the computing device 700 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 711. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, WiFi™, and so forth.

The programs 722 may comprise any type of programs or processes to perform the techniques described in this disclosure. The programs 722 may comprise any type of program that cause the computing device 702 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below; PE Module may also include computer executable instructions that, when executed by processor(s), cause computing device 700 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receive, at a routing engine from an automatic call distributor (ACD) component, first information associated with a call received from a user;

generating, by the routing engine based at least in part on the first information associated with the call, a set of potential call reasons, wherein the set of potential call reasons is generated using a trained machine-learning model;

determining, by the routing engine from the set of potential call reasons, a selected call reason;

identifying, by the routing engine, a support unit associated with the selected call reason;

providing, by the routing engine to the ACD component, an indication of the support unit; and upon determining that the call is rerouted from the support unit to a second support unit, storing information about the rerouted call in a reroute database, and updating the trained machine-learning model based on the stored information about the rerouting of the call to the second support unit, wherein the updated trained machine-learning model is configured to correlate information about subsequent calls to the second support unit based on the stored reroute information.

2. The method of claim 1, further comprising retrieving, by the routing engine, second information associated with the call, wherein the second information associated with the call comprises data maintained in relation to the user.

3. The method of claim 2, wherein the data maintained in relation to the user comprises at least one of billing data for the user, profile data for the user, or usage data for the user.

4. The method of claim 1, further comprising retrieving, by the routing engine, second information associated with the call, wherein the second information associated with the call comprises data maintained in relation to a service associated with the ACD component.

5. The method of claim 4, wherein the data maintained in relation to a service comprises at least one of known issue data for the service or network coverage data for the service.

6. The method of claim 1, wherein the method further comprises assigning a weight value to individual call reasons in the set of potential call reasons, and wherein the selected call reason is determined based on the weight value.

7. The method of claim 1, wherein the support unit is identified based on a mapping between the support unit and the selected call reason.

8. The method of claim 1, further comprising identifying the user based on identifying information received in relation to the call.

9. The method of claim 1, wherein the set of potential call reasons is generated based on differences identified from second information.

10. A computing device comprising:

one or more processors; and one or more non-transitory computer-readable media storing computer-executable instructions that, when executed by the one or more processors, cause computing device to perform operations comprising:

receiving, from an automatic call distributor (ACD) component, first information associated with a call received from a user;

generating, based on the first information associated with the call, a set of potential call reasons wherein the set of potential call reasons is generated using a trained machine-learning model;

determining, from the set of potential call reasons, a selected call reason;

identifying a support unit associated with the selected call reason;

providing, to the ACD component, an indication of the support unit; and upon determining that the call is rerouted from the support unit to a second support unit, storing information about the rerouted call in a reroute database, and updating the trained machine-learning model based on the stored information about the rerouting of the call to the second support unit, wherein the updated trained machine-learning model is configured to correlate information about subsequent calls to the second support unit based on the stored reroute information.

11. The computing device of claim 10, wherein the operations further comprise retrieving second information associated with the call that includes information stored in relation to the user.

12. The computing device of claim 10, wherein the operations further comprise retrieving second information associated with the call that includes information stored in relation to a service associated with the computing device.

13. The computing device of claim 10, wherein at least one potential call reason of the set of call reasons is identified based on a difference in value between a recent value and a historic average value within second information.

14. The computing device of claim 13, wherein the at least one potential call reason of the set of call reasons is identified upon determining that the difference in value is greater than a threshold difference.

15. One or more non-transitory computer-readable media storing computer-executable instructions that, when executed by one or more processors, cause the one or more processors to perform operations comprising:

receiving first information about a call received from a user;

retrieving second information associated with the call;

generating, based on the second information associated with the call, a set of potential call reasons, wherein the set of potential call reasons is generated using a trained machine-learning model;

determining, from the set of potential call reasons, a selected call reason;

identifying a support unit associated with the selected call reason;

providing an indication of the support unit in response to the received information; and upon determining that the call is rerouted from the support unit to a second support unit, storing information about the rerouted call in a reroute database, and updating the trained machine-learning model based on the stored information about the rerouting of the call to the second support unit, wherein the updated trained machine-learning model is configured to correlate information about subsequent calls to the second support unit based on the stored reroute information.

16. The one or more non-transitory computer-readable media of claim 15, wherein the operations further comprise retrieving second information associated with the call that includes information stored in relation to the user.

17. The one or more non-transitory computer-readable media of claim 15, wherein the operations further comprise retrieving second information associated with the call that includes information stored in relation to a service associated with the computer-readable media, wherein the information stored in relation to the service comprises service-related operational data maintained by a service provider system and associated with a service utilized by the user.

18. The one or more non-transitory computer-readable media of claim 15, wherein the operations further comprise assigning a weight value to individual call reasons in the set of potential call reasons, and wherein the selected call reason is determined based on the weight value.

* * * * *